G. C. DOLPH.
Mower.
No. 18,141.
Patented Sept. 8, 1857.
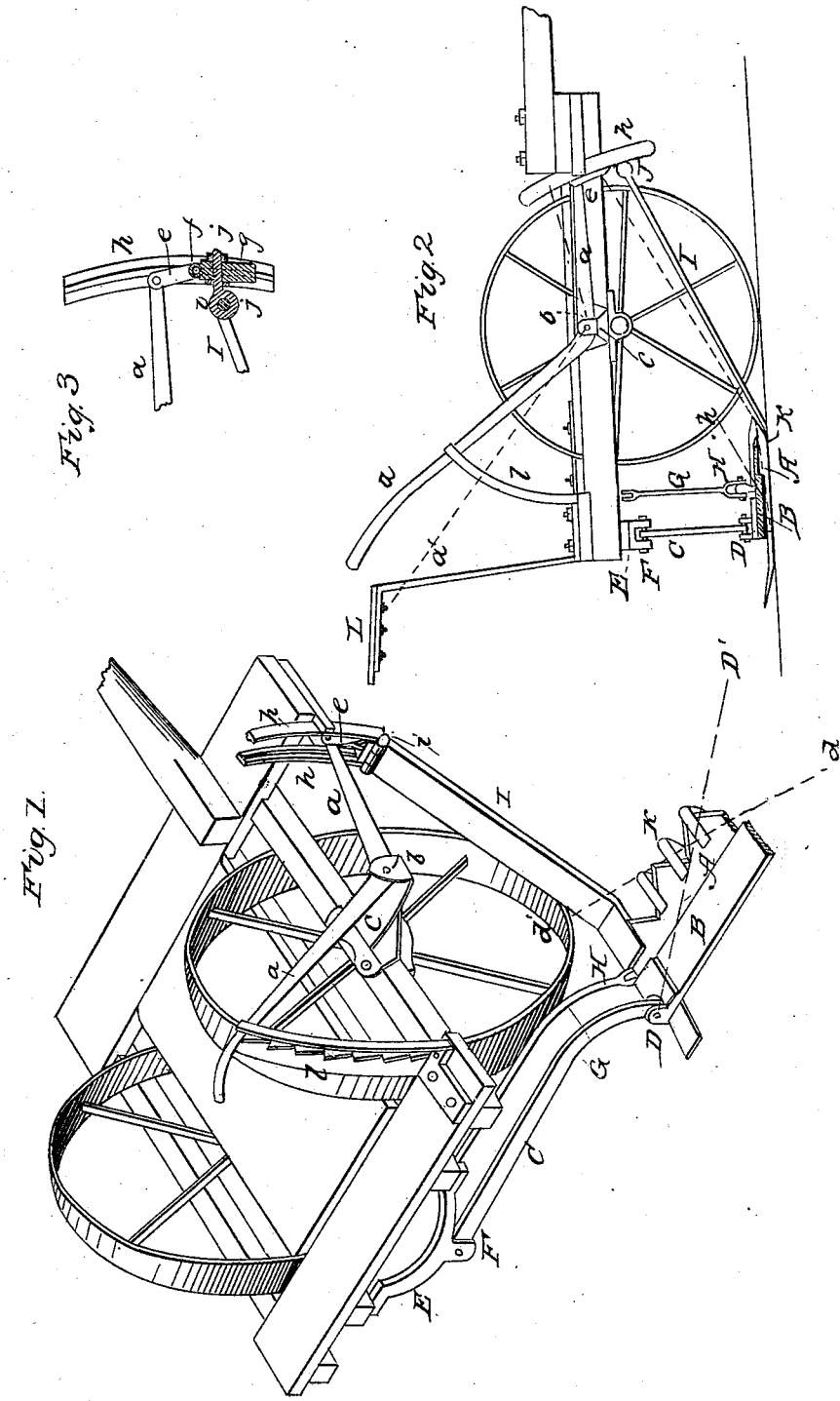

UNITED STATES PATENT OFFICE.

GEO. C. DOLPH, OF WEST ANDOVER, OHIO.

IMPROVEMENT IN MOWING-MACHINES.

Specification forming part of Letters Patent No. 18,141, dated September 8, 1857.

*To all whom it may concern:*

Be it known that I, GEORGE C. DOLPH, of West Andover, in the county of Ashtabula and State of Ohio, have invented a new and useful Improvement in E. Ball's Mowing-Machine, for which a patent was granted June 11, 1856; and I do hereby declare that the following is a full and exact description thereof, reference being had to the accompanying drawings, in which—

Figure 1 is a general view of E. Ball's mowing-machine with my improvement attached; Fig. 2, a side elevation, and Fig. 3 a detached section of the same.

Like letters denote like parts in the several views.

My improvement relates to the manner of tipping or lowering and raising the cutters and cutter-bar. The many advantages to be derived from raising and lowering or tipping the cutters and cutter-bar of mowing-machines are so well understood that they need not be here enumerated.

The cutters A and cutter-bar B are so connected to the frame in Ball's machine that the cutters A and bar B are adjustable only longitudinally; but in my improvement the cutters and bar are made adjustable at right angles.

In Ball's mower the rod C is connected to the bar B by a joint at D, and that rod is also connected to the brace E by a joint at F. The rod G is connected to the cutters at H by a joint, and at the opposite end to a crank. One end of the brace-bar I is firmly attached to the cutter-bar and the other end to a wrist at J. This wrist is so arranged that it turns in a stationary box or socket. By this combination of devices the cutters and cutter-bar are allowed to move only in the manner indicated by the lines D' d d', Fig. 1, and the devices render the cutter-bar and cutters adjustable only so far as raising one end at a time. When the outer end of the cutters and cutter-bar is raised they assume a position indicated by the line from D to D', and when the foot of the cutters and bar is raised they assume a reverse direction, indicated by the line d d'. The bar and cutters by this arrangement cannot be raised entirely from the ground in a parallel direction; nor can the guards K and cutters be tipped up or raised from K to a position indicated by the line k.

What distinguishes my improvement in the described mower is the manner of raising and lowering or tipping the cutters and bar from K to k or any intermediate position. The cutters and bar may be thus operated from the seat L, Fig. 2, or from the ground. The devices employed for this purpose consist, first, of the lever a, which works upon a fulcrum pivot or wrist, b, on the stand or bracket c, which bracket is fastened to the frame. To the short arm of the lever are attached by a pin-joint one or two links, e, Figs. 1 and 3. These links e are also connected by a pin-joint at f to the sliding box g. On each side of this box is a slot or gain, by means of which the box slides up and down upon the ways or guides h h, which are bolted to the frame. These ways form sections of a circle, which is the radius described in raising and lowering the slide-box between the two guides h h by the action of the lever a. The brace-bar I is connected by a joint at i to the wrist j. This wrist passes through the slide-box g, in which it is allowed to turn, and is retained in place by a nut or pin, as seen in Fig. 3. By depressing the lever a in the direction of the line a' the brace-bar, by its connection with the slide-box, will be raised correspondingly; also the cutters and cutter-bar, as indicated by the line k. By the raising and depressing of the lever the cutters and bar may be tipped more or less as the nature of the case may require, and may be retained in any desired position by slipping the lever into the teeth of the rack l, which is attached to the frame.

What I claim as my improvement, and desire to secure by Letters Patent, is—

The lever a, links e, sliding box g, and guides h h, with the adjusting-wrist j, when arranged as herein set forth, and in relation to an adjustable cutter-bar, as described, for the purpose specified.

GEORGE C. DOLPH.

Witnesses:
S. H. MATHER,
I. BRAINERD.